United States Patent
Hoffman et al.

(10) Patent No.: US 9,240,014 B1
(45) Date of Patent: Jan. 19, 2016

(54) METHOD AND APPARATUS FOR PROMOTION OF USERS IN RULES-BASED VIRTUAL WORLDS

(75) Inventors: Steven Samuel Hoffman, San Francisco, CA (US); Naomi Kokubo, San Francisco, CA (US)

(73) Assignee: Lavamind LLC, San Francisco, CA (US)

( * ) Notice: Subject to any disclaimer, the term of this patent is extended or adjusted under 35 U.S.C. 154(b) by 2 days.

(21) Appl. No.: 12/131,003

(22) Filed: May 30, 2008

Related U.S. Application Data

(60) Provisional application No. 60/940,955, filed on May 30, 2007, provisional application No. 60/941,250, filed on May 31, 2007, provisional application No. 60/941,258, filed on May 31, 2007, provisional application No. 60/941,261, filed on May 31, 2007, provisional application No. 60/955,137, filed on Aug. 10, 2007, provisional application No. 60/955,144, filed on Aug. 10, 2007, provisional application No. 60/974,438, filed on Sep. 21, 2007, provisional application No. 61/034,451, filed on Mar. 6, 2008.

(51) Int. Cl.
*G06F 15/16* (2006.01)
*G06Q 30/02* (2012.01)
*G06Q 30/00* (2012.01)
*G06F 15/173* (2006.01)

(52) U.S. Cl.
CPC ............... *G06Q 30/02* (2013.01); *G06Q 30/00* (2013.01)

(58) Field of Classification Search
CPC ... G06Q 30/00; G06Q 30/02; G06Q 30/0269; G06Q 30/0277; G06Q 30/0601
USPC .............. 705/14.1, 14.16; 709/200, 202, 203, 709/219, 229, 238
See application file for complete search history.

(56) References Cited

U.S. PATENT DOCUMENTS

| | | |
|---|---|---|
| 6,106,395 A | 8/2000 | Begis |
| 6,208,659 B1 | 3/2001 | Govindarajan et al. |
| 6,229,533 B1 | 5/2001 | Farmer et al. |
| 6,268,872 B1 | 7/2001 | Matsuda et al. |

(Continued)

OTHER PUBLICATIONS

Johnson, "Black Sun Adds Tools to Manage VR Worlds", Electronic Engineering Times, n926, pp. 152-154, Nov. 4, 1996.

(Continued)

*Primary Examiner* — David Lazaro
*Assistant Examiner* — Vitali Korobov
(74) *Attorney, Agent, or Firm* — Pillsbury Winthrop Shaw Pittman LLP

(57) ABSTRACT

The present invention relates generally to the field of computer and network software, and more particularly it relates to a method and apparatus for promoting and rewarding users within a rules-based virtual world system in accordance with personalized/customized/user-generated content and/or virtual spaces. According to some aspects, the invention allows users to customize virtual content and activities in a manner that drives traffic to their own virtual spaces or those of other users or partners within the system. According to other aspects, the invention provides mechanisms to reward users whose customized content and activities drive a certain level of traffic to partner sites and/or their own virtual spaces. According to further aspects, the invention enables users to promote their customized virtual spaces and/or customized content and activities outside their own circle of friends, and to users of the system as a whole.

12 Claims, 12 Drawing Sheets

(56) References Cited

U.S. PATENT DOCUMENTS

| | | |
|---|---|---|
| 6,314,475 B1 | 11/2001 | Collin et al. |
| 6,612,932 B2 | 9/2003 | Stern |
| 6,618,593 B1 | 9/2003 | Drutman et al. |
| 6,711,581 B2 | 3/2004 | Rebane |
| 6,729,884 B1 | 5/2004 | Kelton et al. |
| 6,746,332 B1 | 6/2004 | Ing et al. |
| 6,749,511 B2 | 6/2004 | Day |
| 6,756,882 B2 | 6/2004 | Benes et al. |
| 6,847,940 B1 | 1/2005 | Shelton et al. |
| 6,874,029 B2 | 3/2005 | Hutcheson et al. |
| 6,879,994 B1 | 4/2005 | Matsliach et al. |
| 6,895,238 B2 | 5/2005 | Newell et al. |
| 6,932,698 B2 | 8/2005 | Sprogis |
| 6,967,566 B2 | 11/2005 | Weston et al. |
| 7,249,139 B2 | 7/2007 | Chuah et al. |
| 7,412,422 B2 | 8/2008 | Shiloh |
| 7,433,834 B2 | 10/2008 | Joao |
| 7,435,179 B1 | 10/2008 | Ford |
| 7,455,586 B2 | 11/2008 | Nguyen et al. |
| 7,480,727 B2 | 1/2009 | Domschitz |
| 7,529,797 B2* | 5/2009 | Tseng .................. G06F 17/3089 709/201 |
| 7,546,254 B2 | 6/2009 | Bednarek |
| 7,685,204 B2 | 3/2010 | Rogers |
| 7,739,357 B2 | 6/2010 | Gould |
| 7,802,200 B1 | 9/2010 | Siegel |
| 7,844,590 B1 | 11/2010 | Zwicky et al. |
| 7,901,288 B2 | 3/2011 | Barsness et al. |
| 7,925,703 B2* | 4/2011 | Dinan .................... H04L 67/34 709/206 |
| 8,002,617 B1 | 8/2011 | Uskela et al. |
| 8,105,153 B2 | 1/2012 | Buecheler et al. |
| 9,026,033 B2 | 5/2015 | Khedouri et al. |
| 9,063,633 B2* | 6/2015 | Rajasingham .......... G06F 3/013 |
| 2002/0013174 A1 | 1/2002 | Murata |
| 2002/0023178 A1* | 2/2002 | Strasnick .......... G06F 17/30899 719/329 |
| 2002/0052925 A1 | 5/2002 | Kim et al. |
| 2002/0059120 A1 | 5/2002 | Milton |
| 2002/0065136 A1 | 5/2002 | Day |
| 2002/0065826 A1* | 5/2002 | Bell .................. G06Q 30/02 |
| 2002/0068631 A1 | 6/2002 | Raverdy et al. |
| 2002/0094870 A1 | 7/2002 | Murray |
| 2002/0099818 A1 | 7/2002 | Russell et al. |
| 2002/0120501 A1* | 8/2002 | Bell .................. G06Q 30/0203 705/14.31 |
| 2002/0178060 A1 | 11/2002 | Sheehan |
| 2003/0014423 A1 | 1/2003 | Chuah et al. |
| 2003/0154126 A1 | 8/2003 | Gehlot et al. |
| 2003/0156135 A1 | 8/2003 | Lucarelli |
| 2003/0191816 A1 | 10/2003 | Landress et al. |
| 2004/0015562 A1 | 1/2004 | Harper et al. |
| 2004/0058694 A1 | 3/2004 | Mendiola et al. |
| 2004/0122895 A1 | 6/2004 | Gourraud |
| 2004/0267943 A1 | 12/2004 | Ryu |
| 2005/0086605 A1* | 4/2005 | Ferrer .................... G06Q 30/02 715/745 |
| 2005/0137015 A1 | 6/2005 | Rogers et al. |
| 2005/0174975 A1 | 8/2005 | Mgrdechian et al. |
| 2005/0227711 A1 | 10/2005 | Orwant et al. |
| 2005/0251440 A1 | 11/2005 | Bednarek |
| 2006/0183551 A1 | 8/2006 | Prudent |
| 2006/0282426 A1 | 12/2006 | Spears |
| 2006/0282530 A1 | 12/2006 | Klein et al. |
| 2006/0294465 A1 | 12/2006 | Ronen et al. |
| 2007/0030824 A1 | 2/2007 | Ribaudo et al. |
| 2007/0033155 A1 | 2/2007 | Landsman |
| 2007/0037574 A1 | 2/2007 | Libov et al. |
| 2007/0043583 A1* | 2/2007 | Davulcu ............ G06F 17/30864 705/1.1 |
| 2007/0043646 A1 | 2/2007 | Morris |
| 2007/0067441 A1 | 3/2007 | Pomerantz |
| 2007/0078962 A1 | 4/2007 | Donnelli et al. |
| 2007/0150537 A1* | 6/2007 | Graham ................ G06Q 30/02 709/203 |
| 2007/0150603 A1* | 6/2007 | Crull .................. G06F 17/3089 709/227 |
| 2007/0156521 A1 | 7/2007 | Yates |
| 2007/0197296 A1 | 8/2007 | Lee |
| 2007/0203828 A1* | 8/2007 | Jung ..................... G06Q 90/00 705/38 |
| 2007/0208751 A1* | 9/2007 | Cowan .................. G06Q 30/02 |
| 2007/0225070 A1 | 9/2007 | Zahorik et al. |
| 2007/0239676 A1 | 10/2007 | Stonehocker et al. |
| 2007/0271273 A1 | 11/2007 | Cradick et al. |
| 2007/0294351 A1 | 12/2007 | El-Emam |
| 2008/0010372 A1 | 1/2008 | Khedouri et al. |
| 2008/0046363 A1 | 2/2008 | Ali et al. |
| 2008/0046458 A1* | 2/2008 | Tseng .................. G06F 17/3089 |
| 2008/0046919 A1 | 2/2008 | Carmi et al. |
| 2008/0059575 A1 | 3/2008 | Malobrodsky et al. |
| 2008/0091692 A1 | 4/2008 | Keith et al. |
| 2008/0097851 A1* | 4/2008 | Bemmel ................ G06Q 30/02 705/14.36 |
| 2008/0097871 A1* | 4/2008 | Williams ............... G06Q 20/10 705/500 |
| 2008/0102947 A1 | 5/2008 | Hayes |
| 2008/0104496 A1* | 5/2008 | Williams ............. G06Q 10/107 715/209 |
| 2008/0126206 A1* | 5/2008 | Jarrell .................... G06Q 30/02 705/14.23 |
| 2008/0140650 A1 | 6/2008 | Stackpole |
| 2008/0160877 A1 | 7/2008 | Lipman |
| 2008/0167129 A1 | 7/2008 | Aaron et al. |
| 2008/0189169 A1 | 8/2008 | Turpin et al. |
| 2008/0215975 A1 | 9/2008 | Harrison et al. |
| 2008/0215995 A1* | 9/2008 | Wolf ....................... G06T 11/00 715/758 |
| 2008/0220876 A1 | 9/2008 | Mehta et al. |
| 2008/0262910 A1 | 10/2008 | Altberg et al. |
| 2008/0262911 A1 | 10/2008 | Altberg et al. |
| 2009/0112701 A1 | 4/2009 | Turpin et al. |
| 2009/0152349 A1* | 6/2009 | Bonev .................. G06Q 30/00 235/383 |
| 2009/0164275 A1 | 6/2009 | Chen et al. |
| 2009/0198666 A1 | 8/2009 | Winston et al. |
| 2009/0241035 A1* | 9/2009 | Tseng .................. G06F 17/3089 715/753 |
| 2009/0254459 A1* | 10/2009 | Williams ............... G06Q 20/10 705/26.1 |
| 2009/0271212 A1 | 10/2009 | Savjani et al. |
| 2009/0292595 A1 | 11/2009 | Tonnison et al. |
| 2011/0167481 A1* | 7/2011 | Ganz .................. G06Q 30/0222 726/5 |
| 2011/0225069 A1 | 9/2011 | Cramer et al. |
| 2011/0276965 A1 | 11/2011 | Nonoyama et al. |
| 2011/0282646 A1* | 11/2011 | Bill ........................ A63F 13/00 704/3 |
| 2012/0015668 A1 | 1/2012 | Mgrdechian |
| 2012/0015724 A1 | 1/2012 | Ocko et al. |

OTHER PUBLICATIONS

Dinesh C. Verma, *Content Distribution Networks: An Engineering Approach*, John Wiley & Sons, 2002, pp. 81-82.

* cited by examiner

METHOD AND APPARATUS FOR PROMOTION OF USERS IN RULES-BASED VIRTUAL WORLDS

CROSS-REFERENCE TO RELATED APPLICATIONS

The present application claims priority to U.S. Provisional Appln. No. 60/940,955 filed May 30, 2007, U.S. Provisional Appln. Nos. 60/941,250, 60/941,258 and 60/941,261, all filed May 31, 2007, U.S. Provisional Appln. Nos. 60/955,137 and 60/955,144 filed Aug. 10, 2007, U.S. Provisional Appln. No. 60/974,438, filed Sep. 21, 2007, and U.S. Provisional Appln. No. 61/034,451 filed Mar. 6, 2008, the contents of which are all incorporated by reference herein in their entirety.

FIELD OF THE INVENTION

The present invention relates to computer and network software, and more particularly it relates to a method and apparatus for promoting and rewarding users in connection with personalized/user-generated virtual worlds and customized virtual world content that drives traffic to their own virtual spaces or other virtual spaces in the system.

BACKGROUND OF THE RELATED ART

There has been a recent surge in "virtual world" technologies that allow users to assume virtual identities (e.g. avatars) and possibly also to interact with other users online, such as Second Life, Habbo, Zwinky, Gaia, Club Penguin, Webkinz. These are typically accessed via dedicated websites and subscriptions, and are typically closed systems (i.e. a user in one virtual community cannot directly interact with users in other virtual communities). These online communities sometimes further offer virtual items that can be bought and sold within their virtual worlds, such as virtual furniture, virtual clothing, virtual real estate, etc.

One problem with existing "virtual world" products is that they typically require users to go to specific online destinations to assume virtual identities and to acquire and use virtual items rather than allowing users to assume virtual identities and/or pick up and use virtual items while browsing any website on the Internet. Accordingly, it would be desirable if a system was provided in which users could interact with other users using virtual identities and/or obtain and use virtual objects and virtual goods while they surf anywhere on the worldwide web.

Meanwhile, there has also been a surge in popularity of many other non-virtual social networking applications such as MySpace, Facebook, etc., as well as many dating sites, such as eHarmony.com, Match.com, etc. These applications also generally require users to go to a specific site in order to interact, and do not allow interactions between users while they are otherwise casually surfing the web. These applications also allow users to promote themselves by customizing their home page and having the most visitors. However, the promotion mechanisms are limited and not very effective in reaching out to new users, and so generally users only interact with a limited circle of friends, and users only visit home pages of their friends.

Co-pending U.S. application Ser. No. 12/037,019, commonly owned by the present assignee, dramatically advanced the state of the art by providing a method and apparatus for distributing virtual objects such as Virtual Collectibles. According to an aspect of the co-pending application, the system automatically allows users to enter virtual world(s) where Virtual Collectibles can be displayed, used, and traded, and where users can interact with other users. Although this functionality by itself vastly improves upon conventional means of promoting on-line activities, additional improvements are possible by further leveraging the discoveries and functionalities of the co-pending application, including improvements that even further overcome the above-described and other disadvantages.

For example, while the virtual world(s) of the co-pending application allows users to interact with Virtual Collectibles and/or other users in entertaining ways, it would be desirable if the principles of the invention of the co-pending application could be extended to allow for users to customize content and activities in a manner that drives traffic to their own virtual spaces, other virtual spaces within the system or websites, and rewarding users accordingly, thereby encouraging users to spend more time and invest more effort in the system.

SUMMARY OF THE INVENTION

The present invention relates generally to the field of computer and network software, and more particularly it relates to a method and apparatus for promoting and rewarding users within a rules-based virtual world system in accordance with personalized content and/or virtual spaces. According to some aspects, the invention allows users to customize virtual content and activities in a manner that drives traffic to their own virtual spaces or those of other users or partners within the system. According to other aspects, the invention provides mechanisms to reward users whose customized content and activities drive a certain level of traffic to partner sites and/or their own virtual spaces. According to further aspects, the invention enables users to promote their customized virtual spaces and/or customized content and activities outside their own circle of friends, and to users of the system as a whole.

In furtherance of these and other aspects, a method and apparatus according to the invention includes identifying content that can be made accessible in a computer network, allowing a user to customize the content, making the customized content available to other users in a virtual space hosted by a server system in the computer network, and monitoring the amount of network traffic associated with the customized content, wherein the user and the other users have clients that are configured to communicate with the server system in the computer network to customize and access the customized content.

DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
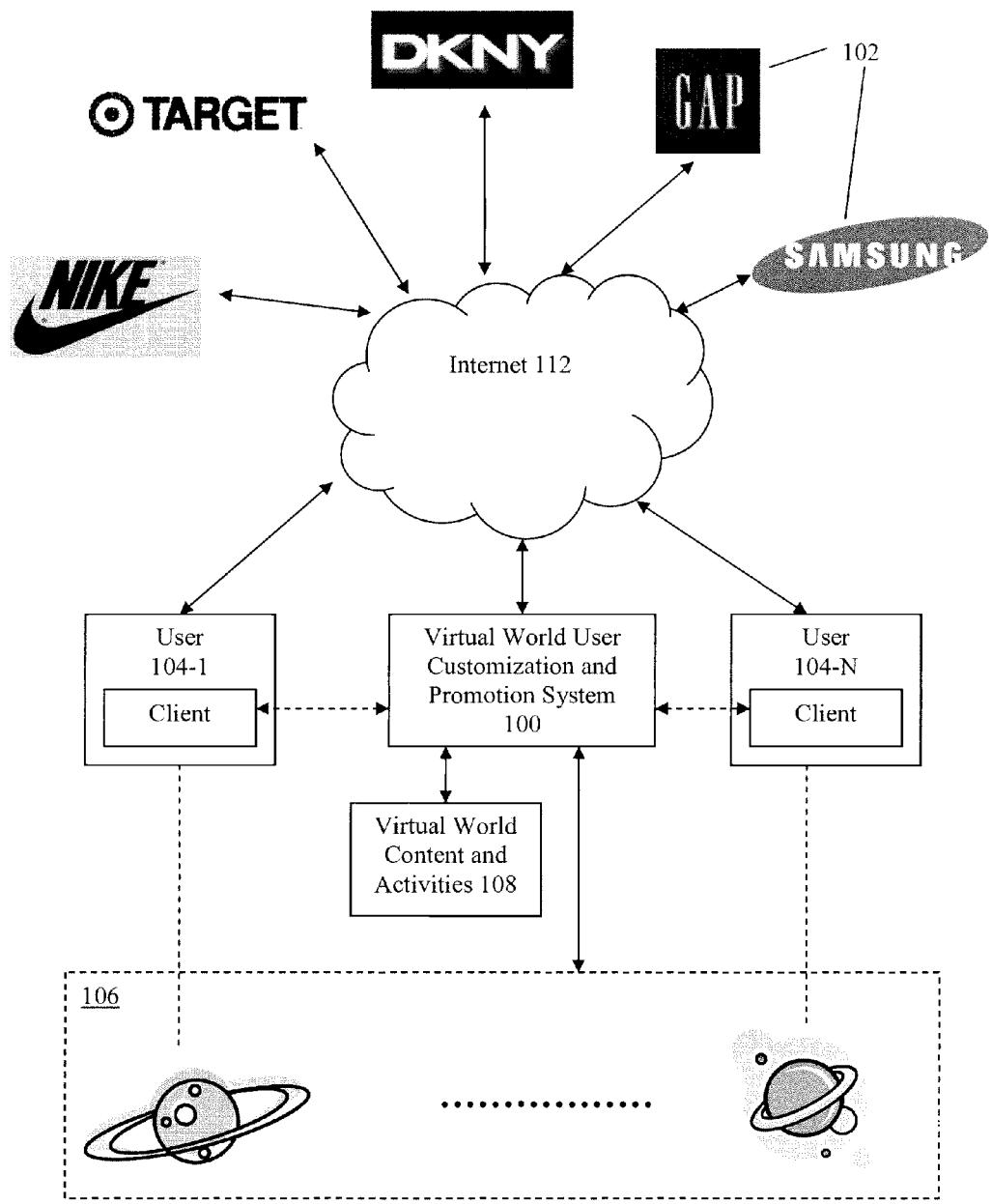
FIG. 1 is a block diagram illustrating the basic concepts of a virtual world system and method according to the invention.

As generally shown in FIG. 1, the present invention can be embodied in a system 100 that allows users 104 to customize and promote virtual world content and activities 108, and to reward users whose customized content and activities drive traffic within virtual worlds 106 and/or to partner websites 102 and/or to other websites. The architecture of system 100 and user 104 clients is such that users 104 can easily interact within virtual worlds 106 while they are casually surfing the Internet 112, including visiting partner websites 102. In particular, and as will be explained more fully below, system 100 provides mechanisms that allow users to customize virtual world content activities 108 and to include such content in their own virtual worlds 106. Moreover, system 100 provides promotion mechanisms that enable users 104 to attract other users of the system 100 who are outside their own circle of friends, and perhaps earn additional points or credits within a rules-based system as a result of driving traffic to their own virtual worlds 106 and/or those associated with partners, including those having websites 102.

According to some aspects, the present invention leverages and expands on the discoveries and functionalities of the above-mentioned co-pending application Ser. No. 12/037, 018. For example, the co-pending application provides an interactive system that distributes virtual objects (i.e. Virtual Collectibles) to users while they are casually surfing the web. Each Virtual Collectible consists of one or more attributes. Attributes may determine the virtual object's appearance, behavior, value, virtual location, ownership, etc. Virtual Collectibles are virtual objects that are potentially unique. According to other aspects, the co-pending application further provides mechanisms to allow users to interact with each other in virtual spaces that are formed and hosted by system 100, such as users' own personal chat rooms or chat rooms associated with publicly accessible web sites.

Returning to FIG. 1, system 100 communicates with users 104-1 to 104-N having clients and associated hosts via Internet 112 to customize and promote virtual content and activities 108 and virtual spaces 106 and to promote and reward users 104 based on how successfully their personalizations drive or attract traffic within the system. In embodiments, system 100 can also communicate with hosts that do not have clients (not shown).

System 100 can be implemented by one or more server computers and associated operating system(s), web server(s), database server(s), and other server and application software such as the servers, software and systems described in any or all of co-pending applications Ser. No. 12/037,019 filed Feb. 25, 2008, Ser. No. 12/118,533 filed May 9, 2008, Ser. No. 12/126,255 filed May 23, 2008, Ser. No. 12/111,916 filed Apr. 29, 2008, Ser. No. 12/106,925 filed Apr. 21, 2008 and Ser. No. 12/129,519 filed May 29, 2008, all incorporated herein by reference in their entirety, as adapted with the customization and self-promotion functionality as will be described in detail herein. According to aspects described in the co-pending applications, and extended herein, system 100 preferably includes functionality that facilitates interactions between users 104 having clients that communicate with system 100. For example, system 100 allows, or perhaps initiates, users 104 having clients to interact with each other based on their virtual location(s) associated with websites 102 (e.g. www-.ford.com, www.coke.com, etc.) that are accessible via Internet 112 by conventional web browsers, for example. It should be apparent that users 104 can also access other websites in addition to partner websites 102, and users can also interact with each other in other ways.

System 100 also preferably includes functionality for hosting games, contests or other rules-based mechanisms that allow users to earn virtual or real goods, points, credits and/or real or virtual currencies. In accordance with certain aspects of the invention, some of these games, contents or rules can be based on how effectively a user's personalizations and customizations of content drive traffic within and outside system 100.

In embodiments, system 100 can reward users based on how successfully their customized virtual world content and activities 108 drive traffic to their own virtual spaces 106 or to other websites, including partner websites 102 of system 100. For example, system 100 can monitor a number of visits to partner websites 102 that are a result of content and activities 108 that have been customized by users 104, and to reward users with virtual currency based on one or more thresholds of visits that result, or for each specific number of visits (e.g. one hundred virtual dollars for each 50 visits generated).

Additionally or alternatively, system 100 can reward users based on a number or frequency of visits of other users to a particular user's virtual space 106. For example, system 100 can host a contest that rewards one hundred dollars in virtual currency to the user 104 who attracts the highest number of other users 104 to their personalized virtual space over one weekend. Many other alternatives are possible, as will be understood by those skilled in the art. In any event, the customization and self-promotion functionalities of the present invention can be useful in conjunction with such games, etc. and can further encourage user participation and interaction.

Virtual worlds 106 maintained and hosted by system 100 are personalized chat rooms/home pages for each user 104 that are accessible to other users, and in which users 104 can preferably interact with each other via text chat, voice chat, and other mechanisms, as described in detail in the co-pending applications, and as will become more apparent from the descriptions herein. According to aspects of the invention described in more detail below, users 104 are able to customize their own virtual worlds 106 with virtual goods (e.g. Virtual Collectibles) that they automatically acquire and/or receive as prizes through the system, purchase using real or virtual currency and/or receive in trades with other users. It should be apparent that it is not necessary for each user 104 to have a virtual world, and that some users 104 may have more than one. Moreover, there may be other virtual worlds 106 that are not associated with users 104 and/or are associated with partners including companies associated with one or more partner websites 102.

It should be noted that system 100 can maintain other user information, such as a user accounts database that includes a list of virtual goods (e.g. Virtual Collectibles) belonging to individual users, and/or credits, points or other real or virtual currency associated with the users that can be redeemed or exchanged for virtual goods, for example. It should be noted that system 100 can maintain other conventional user account information as part of, or separately from virtual worlds information 106, such as usernames, passwords, contact information, etc., in such a database or other locally or remotely accessible storages.

User information maintained by system 100 can also include social networking information such as each user 104's list of friends who are other users 104 within the system, preferences for displaying on on-line presence, etc. Moreover, for each type of information maintained by system 100, system 100 further preferably includes functionality for allowing users 104 to enter, change and view the information. For example, system 100 can include web pages, controls and scripts that can be selected by users 104 via web browsers and/or client applications and which allow the user to access his/her information for viewing or editing. Those skilled in the art will recognize various conventional mechanisms that can be used to implement this functionality, as will become more apparent from the above and following descriptions.

Virtual world content and activities 108 (including or in addition to other virtual world objects such as planets, backgrounds, etc.) are maintained by system 100 as one or more objects that may contain animations, sound, graphics and specific functionality within a game or rules-based system. Virtual world content can be as simple as graphics files. For example, the content could be a .GIF, .JPG, .BMP or .PNG file corresponding to a static image when rendered on a host computer. Virtual content and activities can further or alternatively include an animation file, such as an animated .GIF file or a Flash animation. Virtual content and activities can also further or alternatively include any sort of media file, including any type of audio or movie file, such as MP3, .AVI, .SWF, .MPG, WMV, .WAV, etc. In such cases, content associated with 108 can typically be downloaded or streamed to users 104 via clients and conventional protocols such as http and rendered on hosts using conventional browser functionality and/or functionality in optional multimedia players such as Flash.

It should be noted that virtual world content and activities 108 can be as sophisticated as a programmable bot or application, such as a trivia game, mini-game, interactive pet, or bot endowed with artificial intelligence. In this case, the content and/or activities may come with a client-server architecture of their own, or they may plug into the client-server framework of a larger game or application provided by system 100 and/or downloaded to user 104 clients. For example, an activity could include a Flash game or a Java game, or a Java servlet, or a C++ game, or an Active X control, etc.

According to aspects of the invention, system 100 includes functionality for allowing users to customize virtual world content and activities 108 and/or to include content and activities in their own virtual spaces 106. For example, users can purchase content and activities 108 from system 100 using real or virtual currency and/or receive them in trades with other users. Users can then make them accessible to other users in their own virtual spaces 106. In other embodiments, system 100 can provide a shell version of virtual world content or activity, and provide functionality that allows users to customize them. For example, the system 100 can make a virtual boom box available, and allow the user to customize it with the partner company of their preference, such as Sony or Samsung. The customized boom box can then be placed on the user's home page or virtual world 106, and when other users click on the boom box, they may be given an option to purchase a song or a ringtone, or they may be taken to a corresponding URL that is associated with the partner company and/or the particular product (e.g. Sony boom box product description page) from where they may be able to purchase the real life replica of the boom box. Additional aspects and implementation details will become even more apparent from the further descriptions below.

Referring to FIG. 1, and as explained in more detail in the co-pending applications, users 104 have hosts that can be any type of computing device a person can now or in the future use to access the Internet 112 or other public network, and which can host at least a client application and conventional or future Internet access hardware (not shown) and software such as a web browser. For example, the user 104's host can be implemented by a personal computer such as a Mac, PC, notebook or desktop computer, which typically includes an operating system such as Windows or Mac OS, a browser application such as Windows Explorer or Mozilla Firefox, and network access hardware such as a wired or wireless modem. User 104's host further preferably include graphical displays (e.g. one or more LCD screens) and I/O devices (e.g. keyboard, mouse, keypad, scroll wheels, microphone, speakers, video or still camera, etc.) for providing a user interface within the operating system and communicating with the client application. User 104's hosts are not limited to personal computers, but can include cellular phones, personal digital assistants (PDAs), game systems (e.g. Playstation, Wii, Xbox, etc.) or other devices, and those skilled in the art will understand how implementation details can be changed based on the particular type of host device.

As described in more detail in the co-pending applications, users 104's clients are software applications that reside on the hosts and typically execute under the host operating system. The client software application can be either a standalone application, such as a user interface that occupies a large portion of the computer screen when in use, a plug-in that is embedded into another application such as a web browser and occupies very little screen space or overlays rendered content on top of other web browser content, and/or other type of application and/or screen configuration.

In general operation described in more detail in the co-pending applications, the client application monitors the user's on-line behavior, such as the URLs that the user is visiting via conventional web browsers while casually surfing the web. It transparently sends this user activity information over the Internet to system 100. In the co-pending applications, the sent user activity information can be used for many purposes that enhance or alter the user's on-line experience, such as determining whether to provide virtual goods, services, games, parallel destinations, etc. to the user. System 100 of the present invention can perform some or all of this functionality, in addition to the virtual world customization and promotion functionality according to the invention that is described in more detail above and below.

The client application also preferably provides a graphical interface using the display and I/O devices of the host by which the user 104 navigates through, and interacts with other users in, virtual world(s) maintained and hosted by the system 100. For example, as described in more detail in the co-pending applications and below, system 100 can automatically form chat groups based on the users 104 that are currently visiting the same site, such as the websites 102. System 100 can further automatically cause avatars associated with such users 104 to be displayed either overlaid on top of the regular website content or in parallel virtual worlds associated with the website. System 100 can allow such users 104 to chat with each other and concurrently cause their chat messages to be displayed.

Moreover, as described in more detail below and in the co-pending applications, the user may initiate an event requiring server attention, such as a chat request, from the interface. The user may also interact with other users using chat and other conventional and new online communication mechanisms, including but not limited to voice and video communications, hosted by system 100 and within or without the graphical interface provided by the client application. In embodiments, the graphical interface provides a graphical representation of other users in the form of avatars, and can also display the Virtual Collectibles that the user or other users own, either alone or together with their respective avatars.

Internet 112 is, for example, the public Internet, but can further or alternatively include any combination of wired and wireless networks, public and private, that are traversed by users who seek access to content on the public Internet, as will be appreciated by those skilled in the art. As should be further understood, partner websites 102 and other sites are websites that are publicly accessible via Internet 112 and the World Wide Web and protocols such as IP and http, and are hosted by web servers, servers and databases as understood by those skilled in the art.

It should be noted that the block diagram in FIG. 1 is intended to be illustrative and not limiting, and those skilled in the art will appreciate various alternative configurations, topologies, etc. For example, while only one system 100 is shown, there may be many servers, either in the same location and/or at the same network address, and/or distributed across many locations and/or network addresses. Moreover, system 100, partner websites 102 and other websites, and user 104 hosts are typically all remotely located from each other, both physically and with respect to different network addresses such as IP addresses. Many other alternatives are possible, as will become apparent to those skilled in the art.

Figure 2:
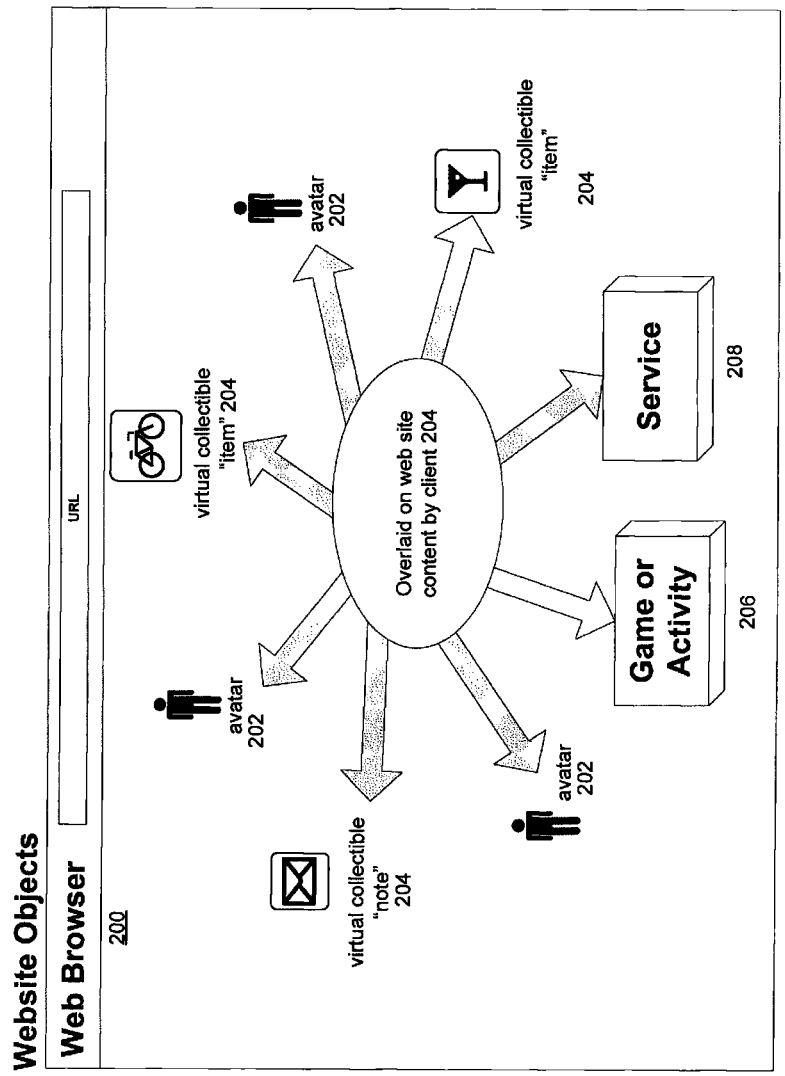
FIGS. 2 and 3 are representations of screen shots illustrating how users can interact in virtual spaces using embedded/overlaid content or parallel destinations, respectively, in accordance with embodiments of the invention.

Certain broad aspects of virtual worlds 106, and how system 100 can allow users to interact with each other in them while casually surfing the web according to embodiments of the invention are illustrated in FIG. 2. As shown in FIG. 2, some embodiments of system 100 allow virtual objects and services to be overlaid on website content (e.g. web page) 200 of partner websites 102 or other websites that is ordinarily rendered for display by a web browser. These virtual objects can include avatars 202, virtual collectibles 204, games or activities 206 and on-line services 208. The mechanisms for displaying such objects and providing such services are described in the co-pending applications.

As described in more detail in the co-pending applications, and similar to virtual content described above, Virtual Collectibles 204 can be simple graphic files and/or images, or sophisticated objects such as a programmable bot or application, such as a trivia game, mini-game, interactive pet, or bot endowed with artificial intelligence.

Avatars 202 are typically personalized by each user, and in some respects can be considered Virtual Collectibles themselves. As described in the co-pending applications and further herein, avatars 202 can be associated with users of the system, and can denote an on-line presence of such users. It should be noted, however, that avatars 202 can also be associated with personnel of partner websites 102 or controlled by the system using scripts and/or artificial intelligence. As such they can interact with users of the system to provide support, direct users to specific pages of interest, inform users about special promotions, act as a host who conducts games and events, etc. The avatars 202 can also be a game object that users can play with and interact with.

Games or activities 206 can include puzzles, mazes, multimedia interactions between users' avatars (e.g. sword fights, tossing a ball, firing weapons and dodging fire, etc.), trivia games, arcade games, word games, social games, games of chance, games of skill, interactive toys and objects, virtual environment games, turn-based games, real-time games, message-based games, web-browsing games, etc. Some aspects of games and activities that can be provided in embodiments of the invention are described in more detail in co-pending application Ser. No. 12/111,916.

On-line services 208 can include bulletin boards, voice chat, blogs, classifieds, e-commerce, messaging, games, advertising, file sharing, financial services, mobile services, photos, music, radio, live broadcasts, news and information, job matchmaking, online dating, social networking, search, retail, consulting services, etc. Certain aspects of on-line services that can be provided in embodiments of the invention are described in more detail in co-pending application Ser. No. 12/118,533.

Figure 3:
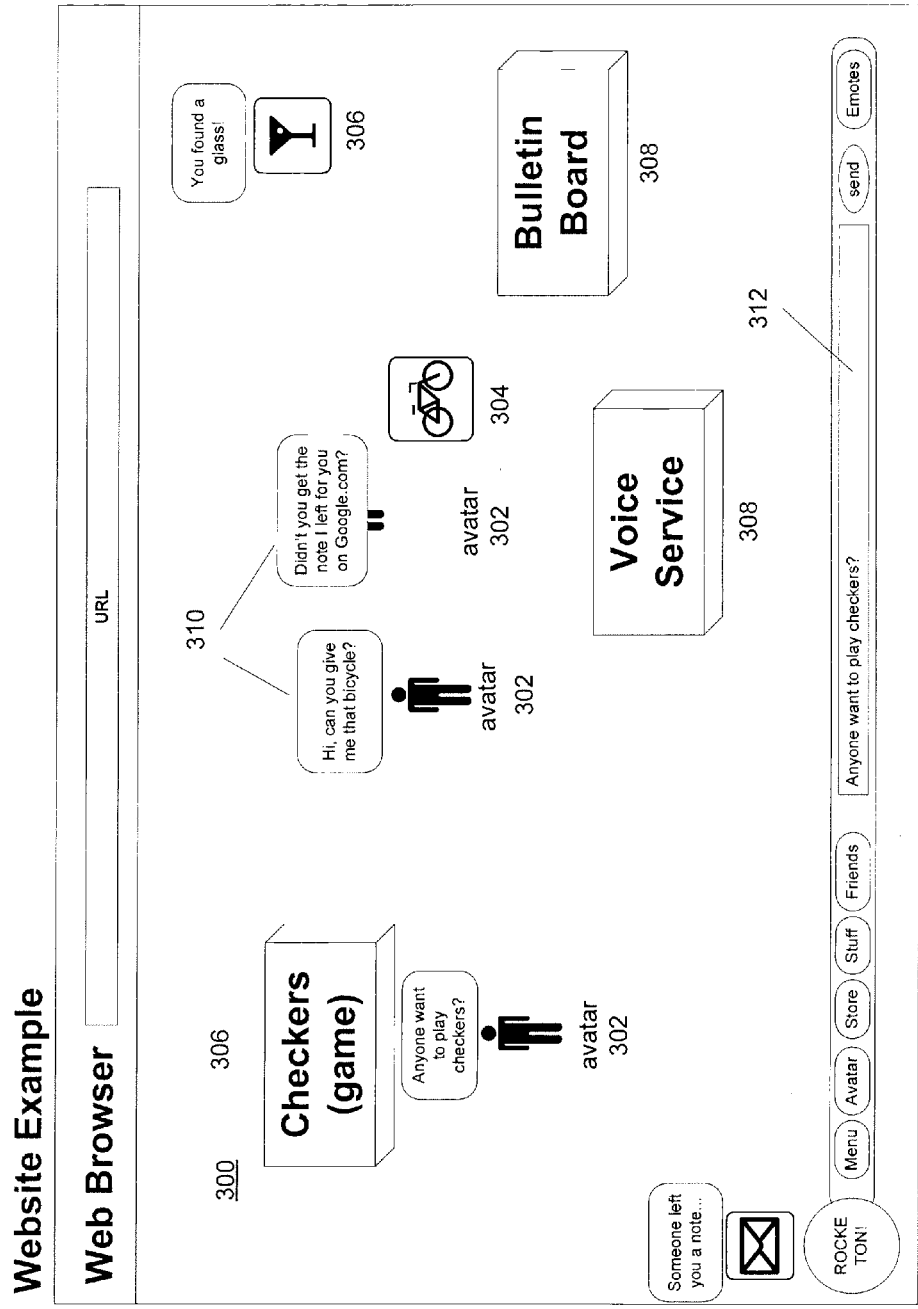

Certain alternative or additional aspects of system 100 according to embodiments of the invention are illustrated in FIG. 3. As shown in FIG. 3, some embodiments of the invention provide virtual worlds 300 that can be accessed by users 104 with clients via search mechanisms, drop-down menus and/or other controls that will become more apparent below. In these embodiments, rather than overlaying or embedding virtual goods and/or on-line services together with normal website content, virtual world 300 completely fills the screen and replaces normal website content, including from partner website 102, or is provided in a separate browser window, for example. Within this parallel destination, virtual objects can be provided, including avatars 302, virtual collectibles 304, games or activities 306 and on-line services 308, as described above as well as in the co-pending applications. Moreover, user interactions, such as chat messages 310 that are entered by users 104 having clients in text box 312, are displayed by system 100 adjacent to their respective avatars 302.

Figure 4:
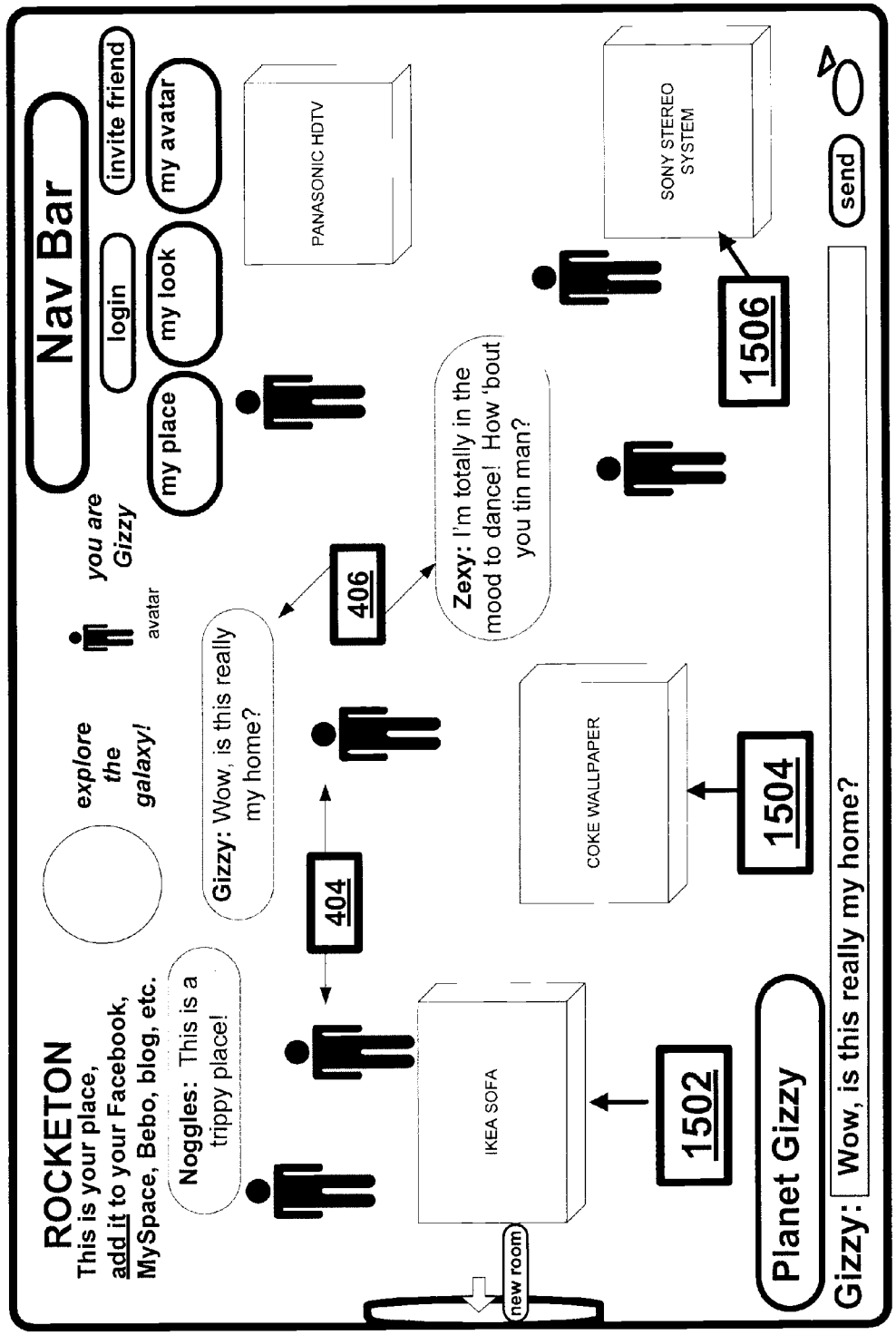
FIG. 4 is a screenshot illustrating how users can interact in one user's personal virtual world hosted by a system according to embodiments of the invention.

FIG. 4 is a screenshot illustrating an example of how embodiments of system 100 can allow users to interact in personalized virtual worlds hosted by the system 100 using chat mechanisms described in the co-pending applications, for example. As shown in FIG. 4, the system 100 can provide a chat room that is customized for an individual user (e.g. Planet Gizzy is a virtual world 106 maintained for a user 104 having the screen name Gizzy). In this example, the user's virtual world content is provided in a separate browser screen from other website content. However, the virtual world may instead have a transparent background, and so the users may see their chatting avatars on top of the web page(s) of the web site that the users are browsing, as described above in connection with FIG. 2.

As shown in FIG. 4, system 100 represents users 104 in the virtual world chat room by their respective avatars 404, and their last entered chat message(s) 406 can be displayed adjacent to their avatars, along with their usernames. Moreover, any user can interact or view information about other users by mousing over and right-clicking on the user's avatar 404. As further shown, users 104 can customize their own virtual worlds with objects (e.g. Virtual Collectibles) such as virtual furniture (e.g. sofa 1502), virtual backgrounds (e.g. Coke Wallpaper 1506) and virtual entertainment (e.g. Sony stereo 1506).

Example implementations of certain aspects of the customization and self-promotion functionalities provided in accordance with embodiments of the present invention will become apparent from the above descriptions in conjunction with the following FIGS. 5 to 8. In general, FIGS. 5 to 8 are screenshot representations illustrating web page and other content served and displayed by system 100 based upon information, preferences and selections by users 104, as described in more detail below and in the co-pending applications. Details necessary for an understanding of the present invention will be provided below, while other details provided in the co-pending applications or otherwise apparent to those skilled in the art will be omitted for clarity of the invention. Moreover, those skilled in the art will understand how to implement mechanisms for allowing system 100 to communicate with user 104 clients to provide the functionality reflected in the screen shots based on the below descriptions as well as those in the co-pending applications.

Figure 5:
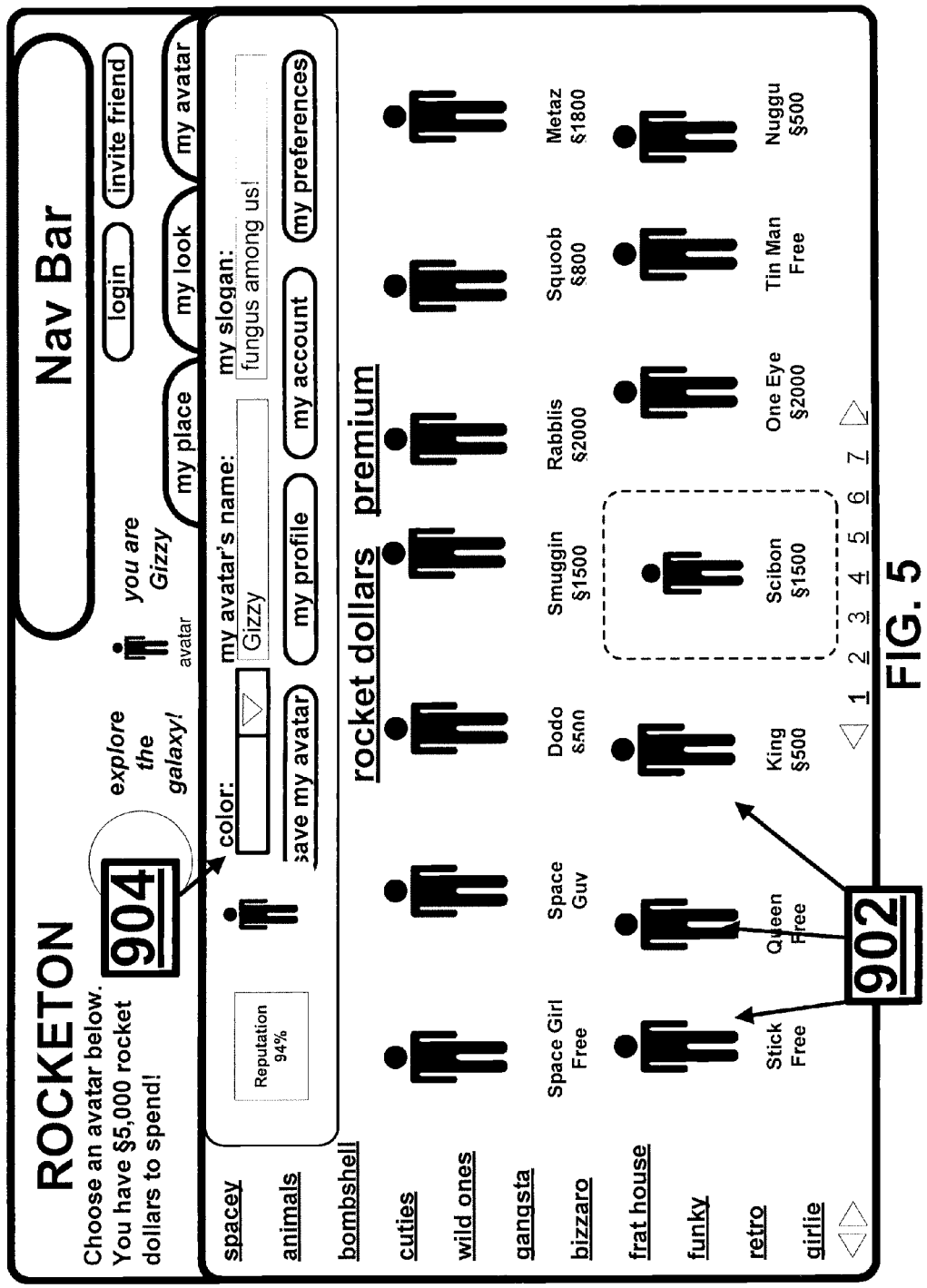
FIGS. 5 to 8 are screenshots illustrating various aspects of customizing and promoting users' personalized virtual worlds in accordance with embodiments of the invention.

FIG. 5 shows one example of how users can customize their own virtual spaces 106. FIG. 5 shows how system 100 can provide screens illustrating avatars 902 and accessories that users can purchase using real or virtual currency or get for free. Similar screens can be provided for other virtual objects such as furniture, games, bots, etc. System 100 can also provide search mechanisms (e.g. text boxes for inputting keywords) that allow users to search for desired virtual objects.

According to aspects of the invention, when certain virtual objects are purchased for a user's own virtual space, or if the user 104 selects to promote their virtual spaces (e.g. by paying extra or other premium), the system can generate system-wide messages related to the event.

Figure 6:
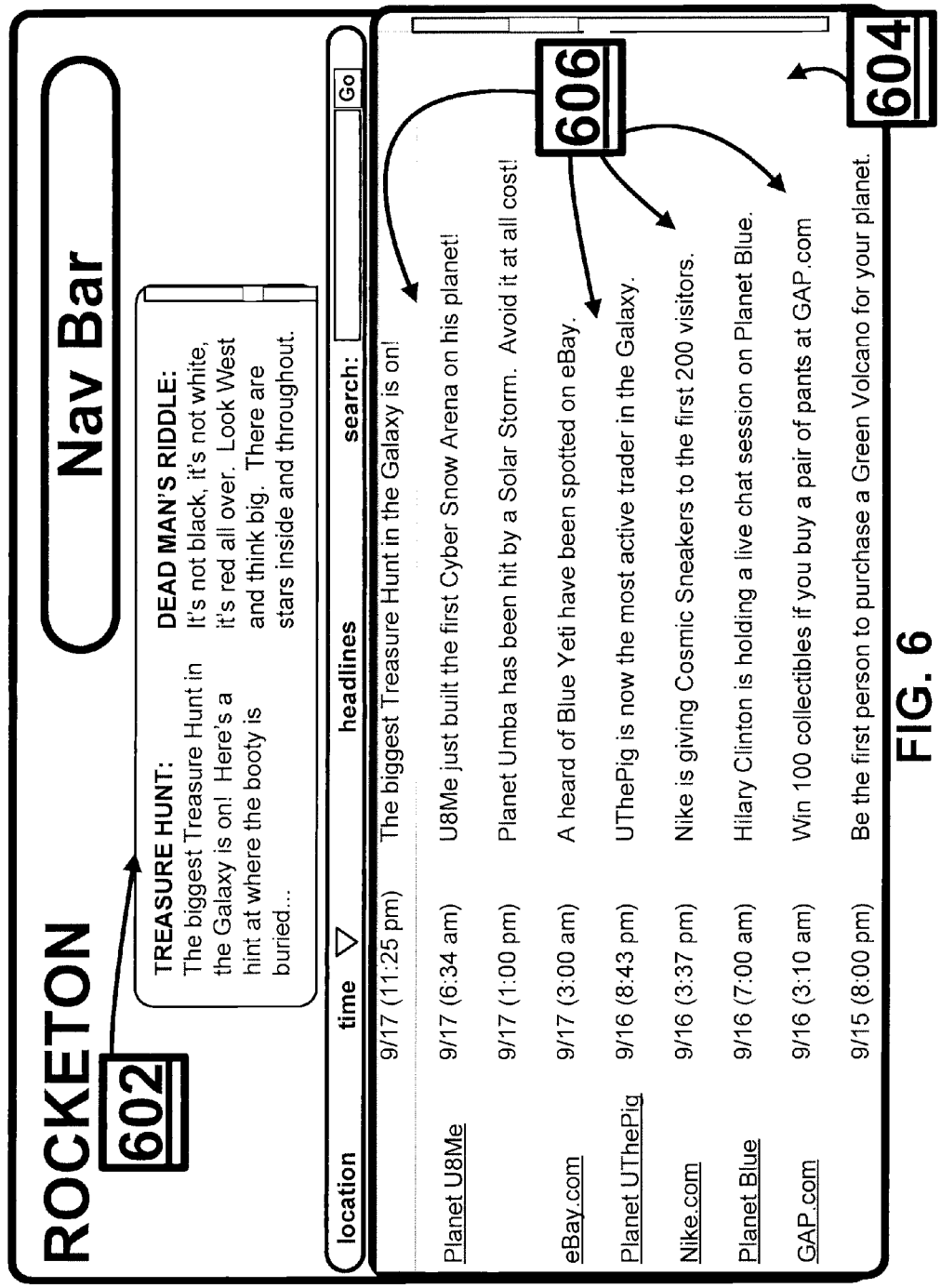

FIG. 6 shows example mechanism for promoting users and/or their virtual spaces according to aspects of the invention. As shown in FIG. 6, system 100 can provide a "News and Events" page where the system 100, users 104 and/or partners 102 can post news bulletins 606. In the example shown in FIG. 6, the news and events bulletins 606 includes one that a user named "U8Me" has customized his/her virtual world with a virtual game named "Cyber Snow Arena".

Figure 7:
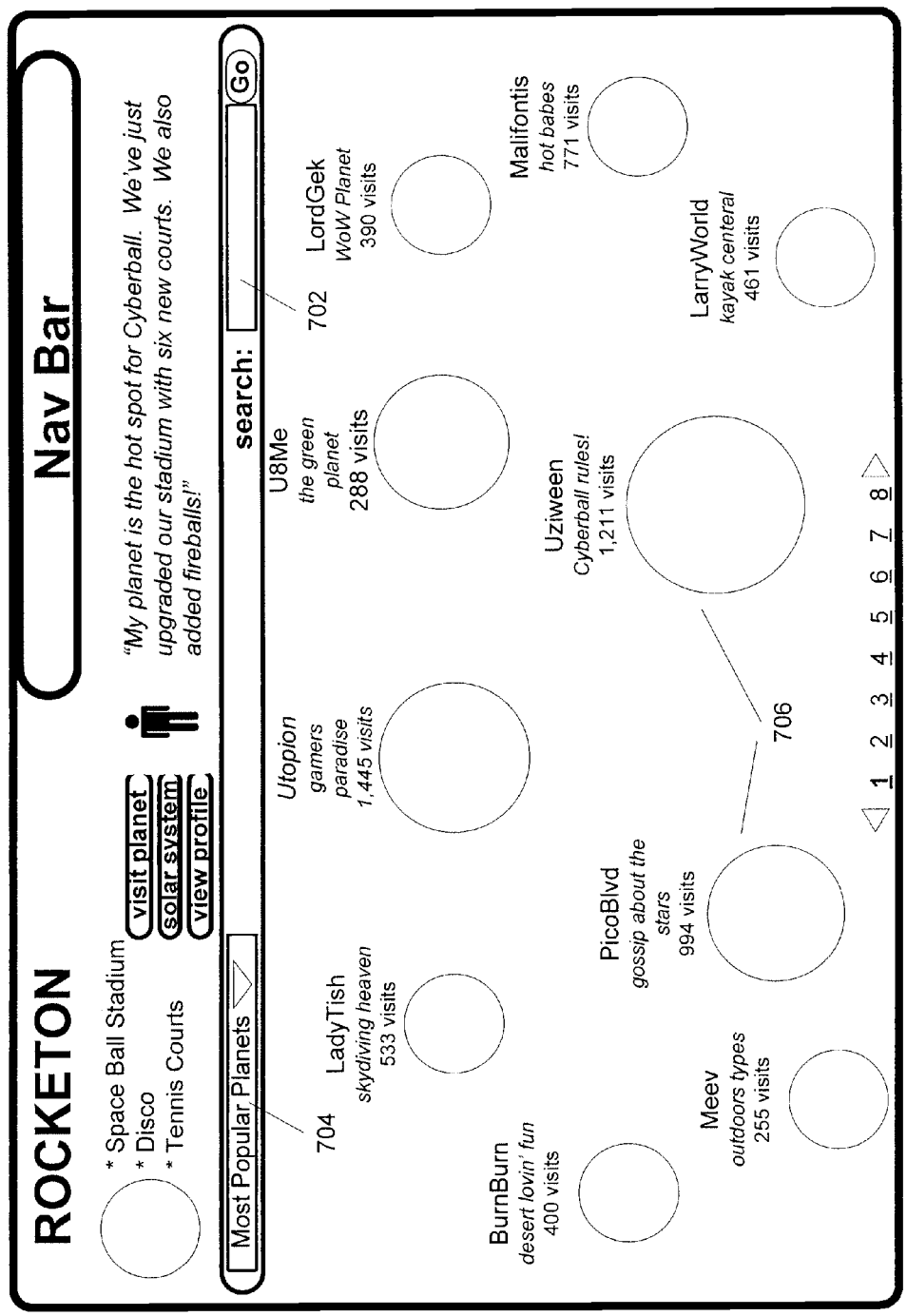

FIG. 7 is another example of how the system allows users to promote their own virtual spaces. As shown in FIG. 7, the system 100 can provide pages, scripts and/or controls that allow users to search for virtual spaces 702 of other users. These can be graphically presented on the page, as well as short descriptions 704. As further shown in FIG. 7, certain individual virtual spaces 702 can be promoted by users 104 and/or system 100 in banner messages 706.

Figure 8:
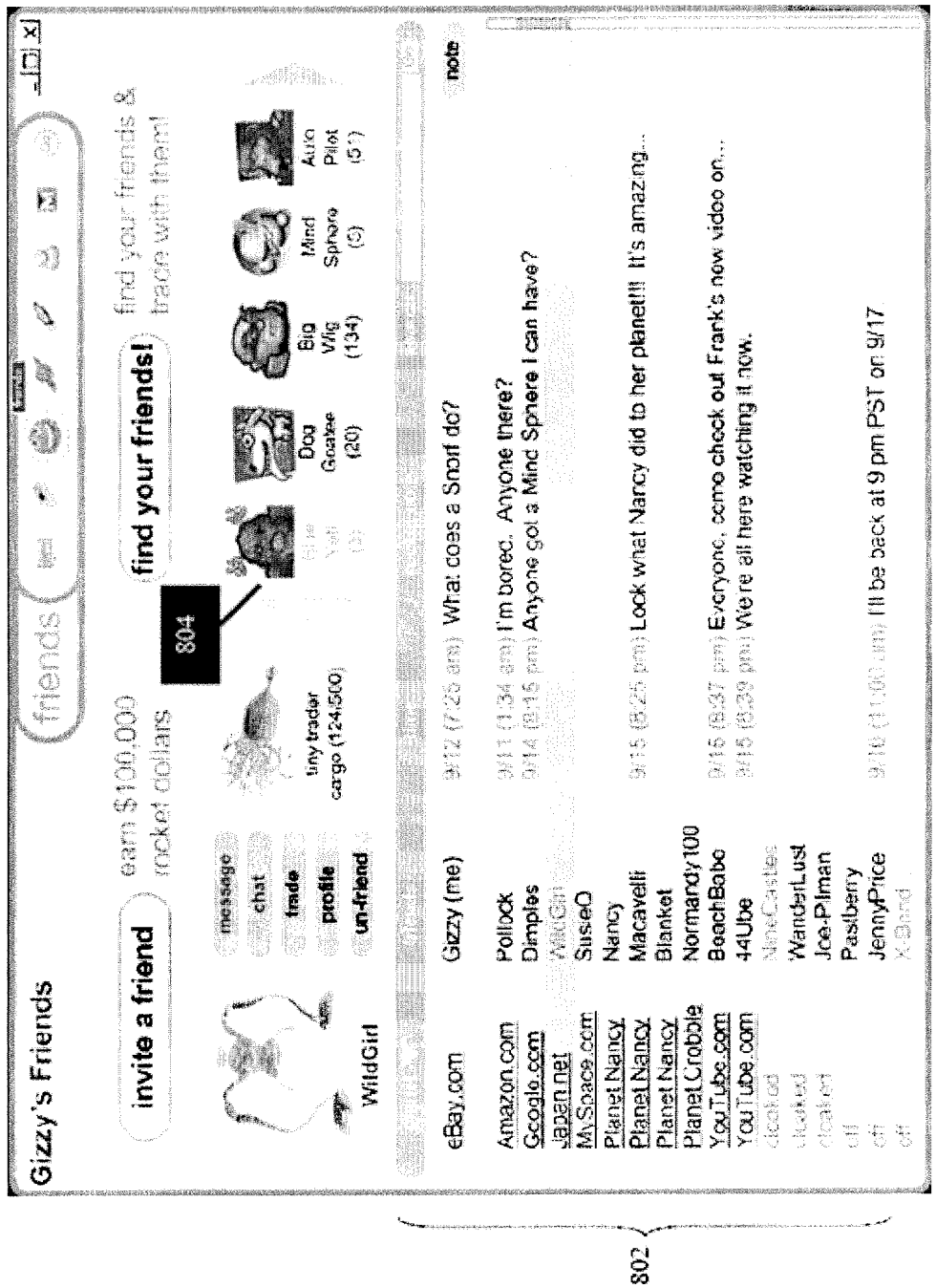

FIG. 8 is another example of how the system allows users to promote their own virtual spaces according to aspects of embodiments of the invention. In this example, the system 100 can allow the user 104 to view a list 802 of all his/her friends, and the names of friends who meet the user's particular criteria are shown in a special color. As shown, system 100 can also display the latest on-line location of the friends and/or their latest messages In this example, users named "Macavelli" and "BeachBabe" provide messages that comment on what other users have added to their virtual spaces. These messages thereby encourage other users to visit those virtual spaces.

FIGS. 9 to 12 are flow diagrams illustrating various aspects of how system 100 can allow users to customize virtual world content and activities, which can further drive traffic within the system 100 and/or to partner sites, and to reward users accordingly. Those skilled in the art will recognize various additional or alternative embodiments of the invention after being taught by these examples.

Figure 9:
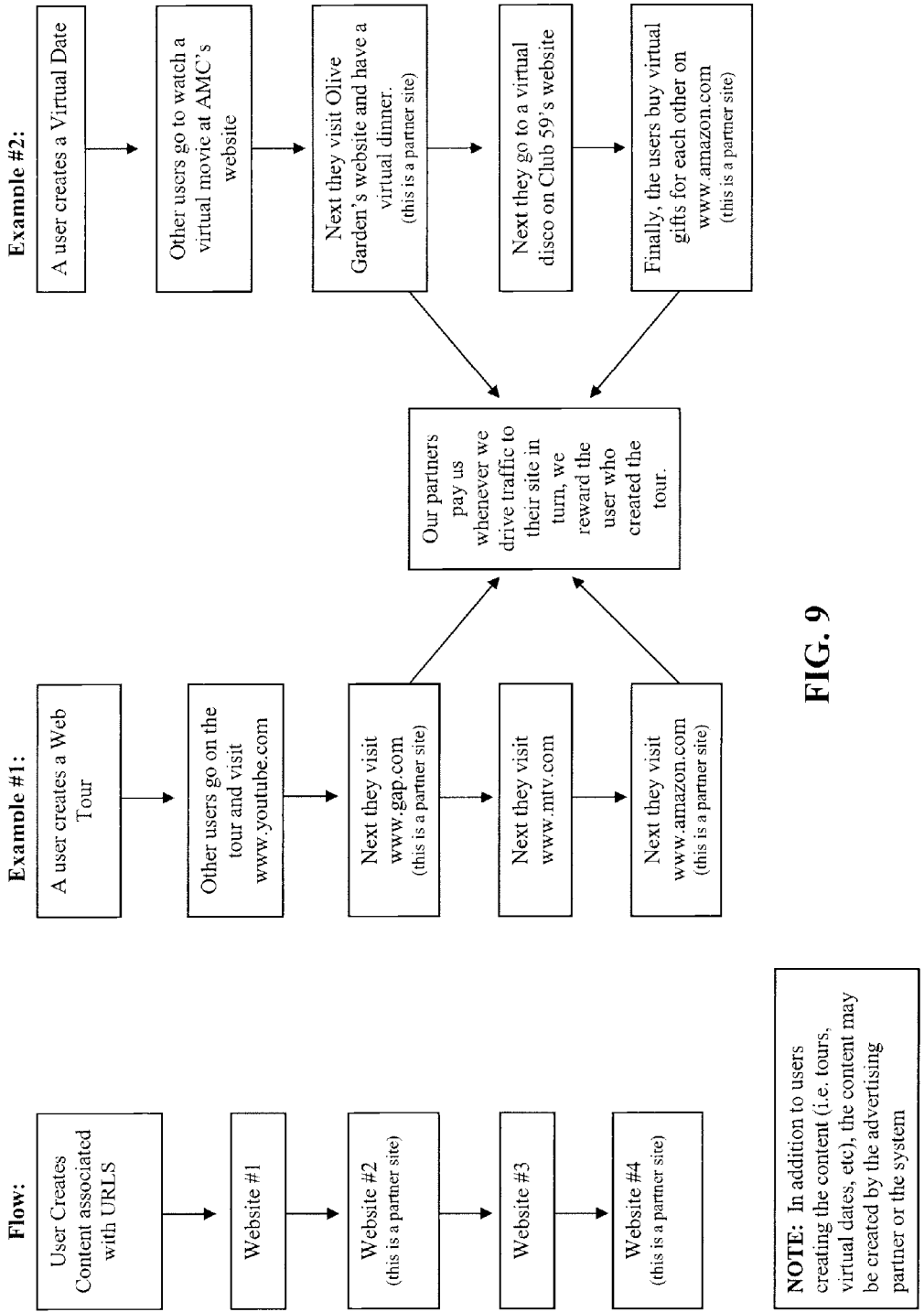
FIGS. 9 to 12 are flow diagrams illustrating various aspects of customizing virtual world content and activities, which can result in increasing traffic flow within and outside a system according to embodiments of the invention.

FIG. 9 illustrates an example methodology of how the system 100 allows user-generated activities to drive traffic to URLs, for example URLs of partner websites 102 of the system, and for users to be rewarded accordingly. In this method, the user can create a string of URLs, some of which are associated with partners. In a first example, the string of URLs is a virtual web tour that the user makes available on his/her own virtual space 106, e.g. by clicking on an object the user places on his/her virtual space. Included in the tour are URLs of partner sites 102. The more entertaining the tour, the more users will go on the tour and will encourage other users to go on the same tour. In the next example, the user creates a virtual date, and can invite another user 104 to join them on it (e.g. by browser sharing techniques that should become apparent to those skilled in the art). In the virtual date, the user and his/her date visit different websites, some of which can be associated with partners 102. The more engaging the virtual date, the more word will spread about the specific virtual date, and as a result, more users will go on the virtual date that are highly recommended by other users. The system 100 can further monitor this activity, and will know that it is associated with the user-generated content. Accordingly, system 100 can be rewarded by partners for this monitored activity, and in turn can reward the users that generated this traffic.

Figure 10:
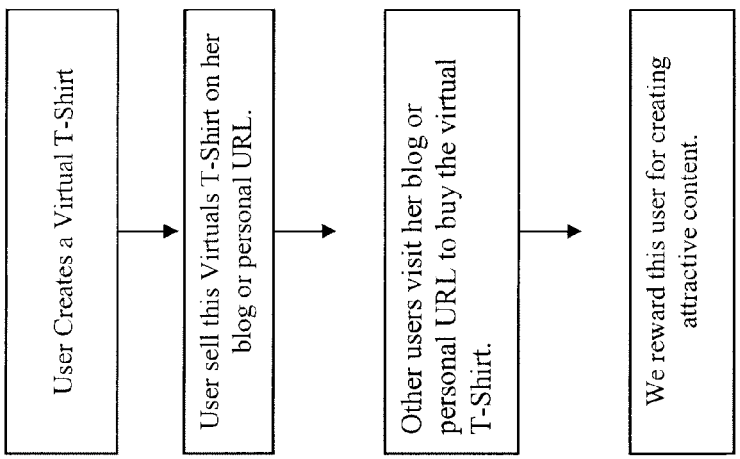
Figure 10:
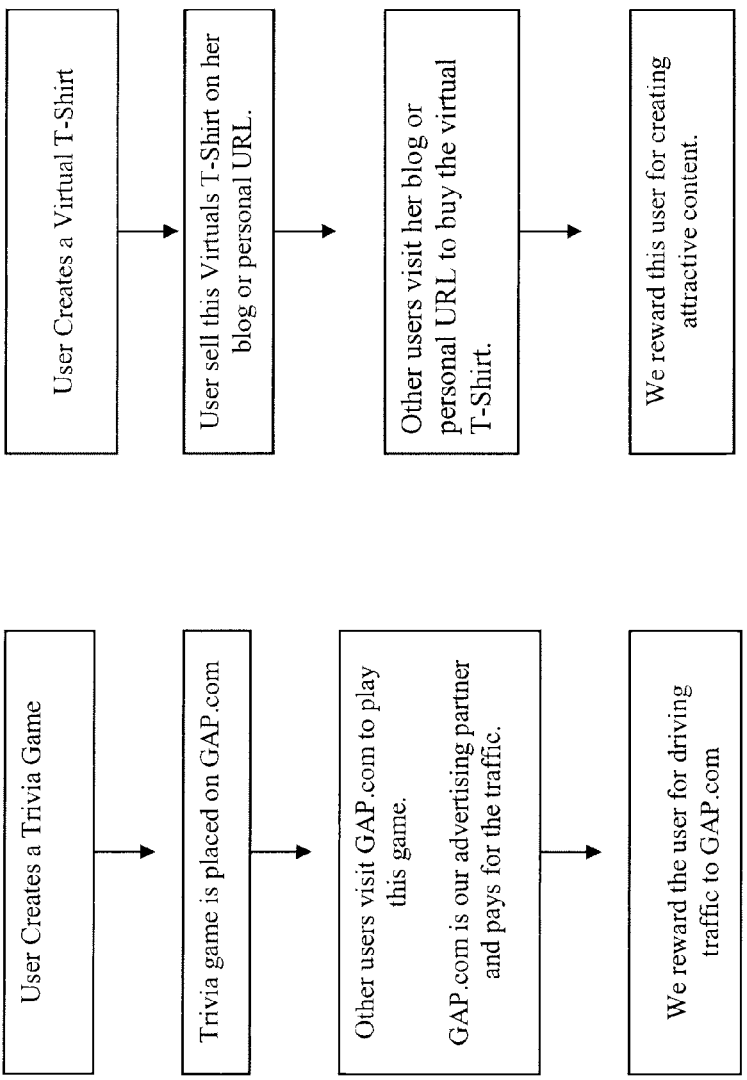
Figure 10:
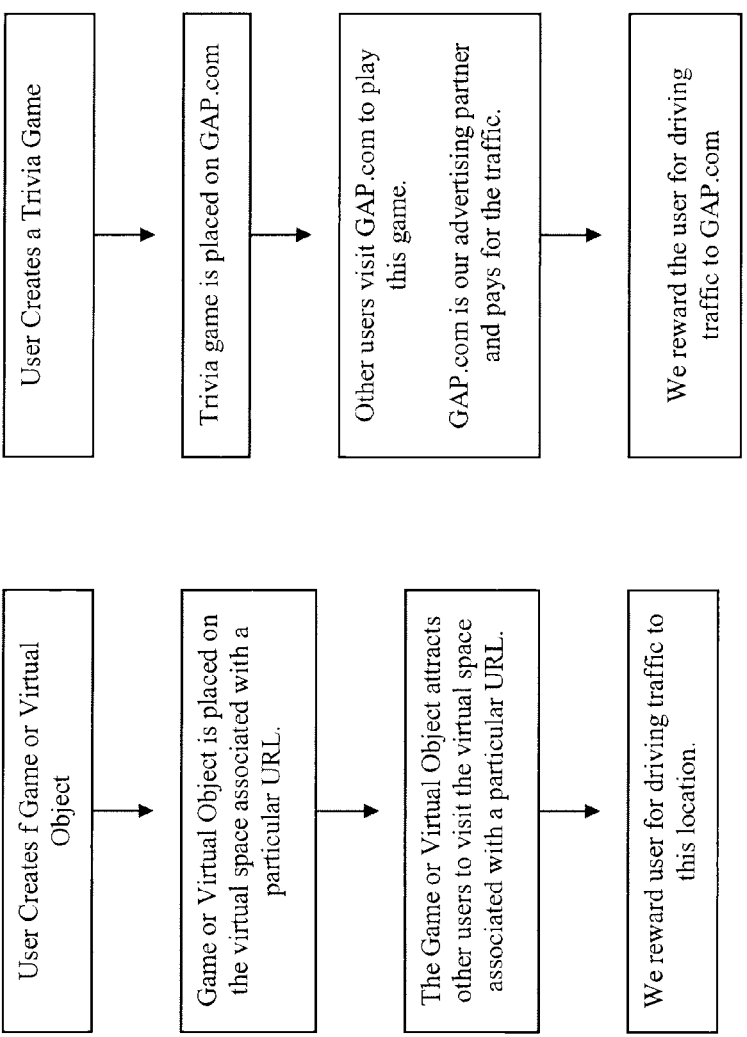

FIG. 10 illustrates an example methodology of how the system 100 allows user-generated content to drive traffic to particular virtual spaces, for example virtual spaces of partners of the system, and for users to be rewarded accordingly. In this method, the user can create a game or virtual object, which attracts other users to visit a virtual space associated with it, some of which are associated with partners. In a first example, the user creates a trivia game and places it on GAP.com. Other users 104 of the system can learn about the game through various means, including those described above in connection with FIGS. 5 to 8, and visit GAP.com to play it. The system can monitor the number of visits and game participants, and rewards the user who created the game accordingly. In the next example, the user creates a virtual T-shirt and makes it available for purchase by other users 104, such as by placing the object in their own virtual space 106. If other users 104 purchase their own instance of the virtual T-shirt using real or virtual currency, the system 100 can reward the user accordingly.

Figure 11:
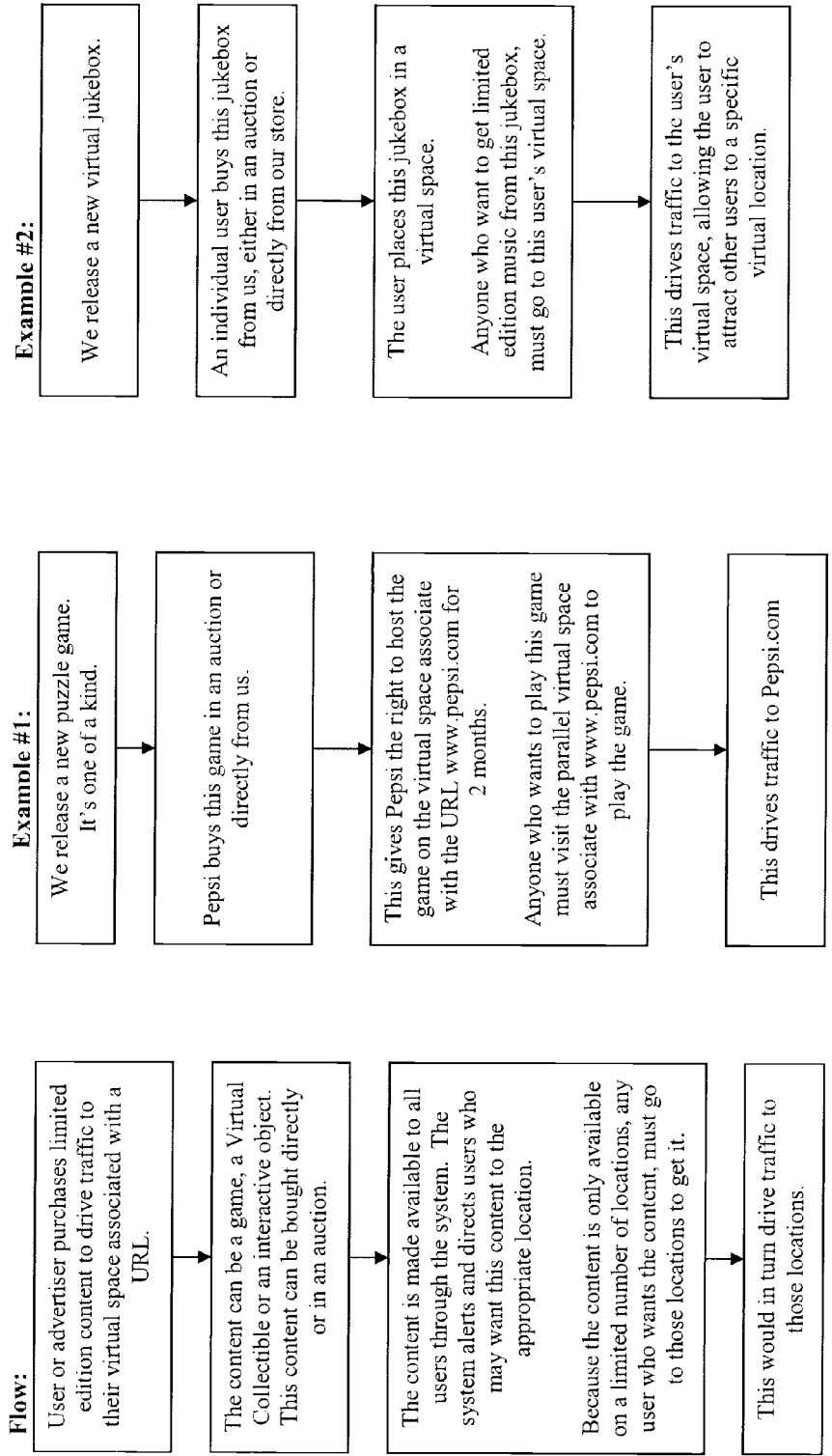

FIG. 11 illustrates an example methodology of how generated or acquired content can drive traffic within system 100 to partner sites 102. In this method, very unique and/or highly desirable content is made available to users or partners for purchase, which in turn causes traffic to be driven to the purchasing partner or user 104. In a first example, the content is a one-of-a-kind puzzle game that is licensed for two months to a partner company having a website 102 such as Pepsi.com. Pepsi places the game on its website and system 100 promotes the game using mechanisms such as those described above in connection with FIGS. 5 to 8. Traffic is thus driven to Pepsi.com both through the explicit promotion and inherent value of the puzzle. In the next example, the system 100 makes a virtual jukebox available, which can be acquired by a user and placed on their own virtual space 106, and possibly promoted as described above. This drives traffic to the user's virtual space 106.

Figure 12:
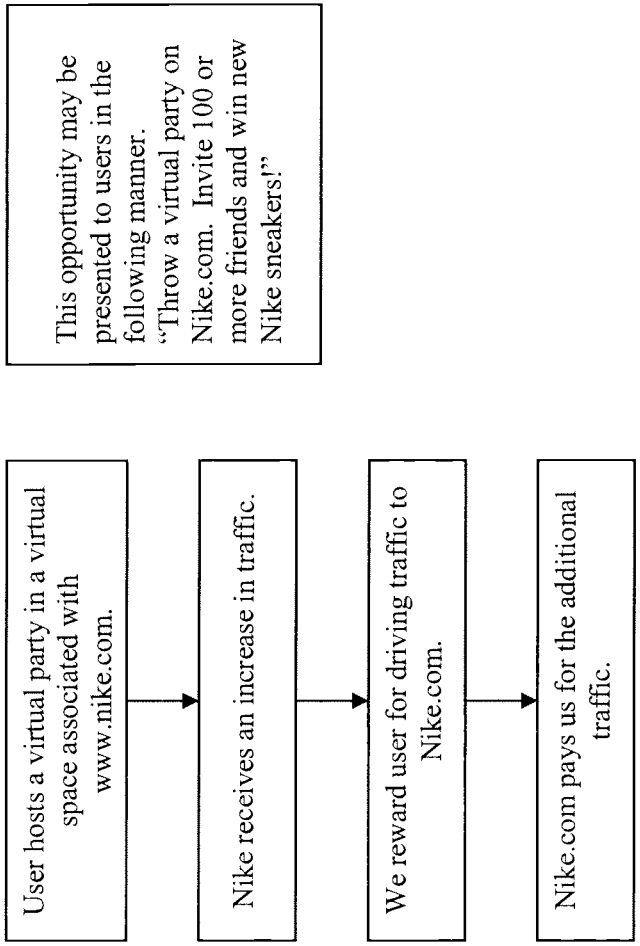
Figure 12:
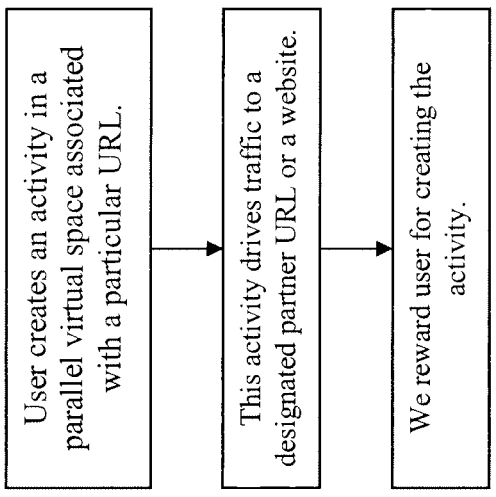

FIG. 12 illustrates another example methodology of how the system 100 allows user-generated activities to drive traffic to URLs, for example URLs of websites 102 of partners of the system, and for users to be rewarded accordingly. In this method, the user can create a virtual activity, which is placed in a virtual space associated with a partner or other website 102. The user is then rewarded for the amount of traffic resulting from the virtual activity. For example, the user can host a virtual party in a virtual space associated with www.nike.com. The system 100 monitors the number of users 104 participating in the virtual party, which results in an increase in Nike's on-line traffic, and rewards the user accordingly.

According to certain aspects of the invention, further entertainment value for users (and as a result, added traffic for the system and partner web sites) can be provided by allowing users to customize their own virtual spaces with virtual goods (e.g. Virtual Collectibles), either for entertainment value itself, or to gain prizes according to the terms of a game conducted by the system, for example to obtain Combos, as described in more detail in the co-pending applications.

The example implementations described above should be considered illustrative rather than limiting, and many combinations, divisions, deletions, alterations and supplementations even within the above described implementations are possible, as should become apparent to those skilled in the art. For example, and without limitation, aspects of the invention can be combined in various ways with the functionalities described in the co-pending applications.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method, comprising:
    hosting, by a server system, a virtual world comprising a plurality of different personalized virtual worlds whose content is respectively controlled by a plurality of different users exclusive of the other users;
    identifying virtual world content that can be made accessible in a computer network;
    allowing a user to customize the virtual world content, wherein allowing the user to customize the virtual world content includes allowing the user to customize how two or more of the user and other users can interact with each other in the user's personalized virtual world using content displayed in the user's personalized virtual world and their respective clients;
    promoting the user's personalized virtual world to other users in the virtual world;
    monitoring the amount of network traffic associated with the customized virtual world content in the user's personalized virtual world,
    wherein the user and the other users have clients that are configured to communicate with the server system in the computer network, and
    wherein the clients are user applications that are in addition to a standard web browser, such that the users must have the user applications installed in addition to the standard web browser, the user application and the standard web browser both being installed on a respective common computing device for each respective user, the common computing device being separate from the server system, and
    wherein the step of allowing the user to customize the virtual world content includes allowing the user to create a virtual tour of different websites using a string of a plurality of different URLs respectively associated with the different websites on the virtual tour; and
    allowing the user and the other users to simultaneously take the virtual tour together using browser sharing techniques.

2. A method according to claim 1, wherein the user has a list of friends among the other users, and wherein the promoting step reaches other users who are not among the user's listed friends.

3. A method according to claim 1, further comprising:
    rewarding the user in accordance with the monitored amount of traffic, wherein rewarding includes providing a virtual good that can be displayed in the user's personalized virtual world.

4. A method according to claim 3, wherein the virtual good comprises a rare virtual object.

5. A method according to claim 1, wherein the step of allowing the user to customize the virtual world content includes allowing the user to create a virtual object within the virtual world.

6. A method according to claim 1, wherein the step of allowing the user to customize the virtual world content includes allowing the user to host the virtual world activity in the user's personalized virtual world.

7. A method according to claim 1, wherein the clients communicate their presence in the user's virtual world to the server system, and wherein the server system provides the customized content to the users via the clients.

8. A method according to claim 1, wherein the step of making the customized virtual world content available includes providing avatar content for rendering to the user and other users, and allowing the user and other users to communicate with each other in the virtual world using the avatar content.

9. A method according to claim 1, wherein allowing the user to create the virtual tour includes allowing the user to arrange the plurality of different URLs in a predetermined sequence.

10. A method according to claim 1, wherein at least of the websites on the virtual tour is a website of a partner of a company associated with the server system.

11. A method comprising:
    hosting, by a server system, a virtual world comprising a plurality of different personalized virtual worlds whose content is respectively controlled by a plurality of different users exclusive of the other users;
    identifying virtual world content that can be made accessible in a computer network;
    allowing a user to customize the virtual world content;
    making the customized virtual world content available to other users in the user's personalized virtual world and hosted by a server system in the computer network; and
    monitoring the amount of network traffic associated with the customized virtual world content in the user's personalized virtual world,
    wherein the user and the other users have clients that are configured to communicate with the server system in the computer network to customize and access the customized virtual world content, and
    wherein the clients are user applications that are in addition to a standard web browser, such that the users must have the user applications installed in addition to the standard web browser to access the customized virtual world content, and wherein the virtual world is associated with a publicly accessible website address, and wherein the clients communicate their presence at the publicly accessible website address to the server system that is remotely located from the publicly accessible website address, and wherein the server system provides the customized virtual world content to the users via the clients in response to communications regarding their presence at the publicly accessible website address, and wherein other users that are not configured with the clients and who access the publicly accessible website address are unable to communicate with the server system and therefore cannot receive the customized virtual world content but can access other content available at the publicly accessible website, and wherein the clients are configured to display content from the server system associated with the virtual world simultaneously with content from the publicly accessible website address via a same window of the standard web browser.

12. A method according to claim 11, wherein the step of making the customized virtual world content available includes providing avatar content for rendering to the user and other users, and allowing the user and other users to communicate with each other in the virtual world using the avatar content.

* * * * *